(12) United States Patent
Sabripour (10) Patent No.: US 9,744,871 B2
(45) Date of Patent: Aug. 29, 2017

(54) AUTOMOTIVE RECHARGE SCHEDULING SYSTEMS AND METHODS

(71) Applicant: Shey Sabripour, Austin, TX (US)

(72) Inventor: Shey Sabripour, Austin, TX (US)

(*) Notice: Subject to any disclaimer, the term of this patent is extended or adjusted under 35 U.S.C. 154(b) by 84 days.

(21) Appl. No.: 14/695,509

(22) Filed: Apr. 24, 2015

(65) Prior Publication Data

US 2015/0306969 A1 Oct. 29, 2015

Related U.S. Application Data

(60) Provisional application No. 61/984,353, filed on Apr. 25, 2014.

(51) Int. Cl.
| | |
|---|---|
| *G01C 21/36* | (2006.01) |
| *G06Q 30/00* | (2012.01) |
| *B60L 11/18* | (2006.01) |
| *H02J 7/00* | (2006.01) |

(52) U.S. Cl.
CPC ....... *B60L 11/1848* (2013.01); *B60L 11/1824* (2013.01); *B60L 11/1838* (2013.01); *G06Q 30/00* (2013.01); *H02J 7/00* (2013.01); *H02J 7/0027* (2013.01); *B60L 2230/16* (2013.01); *B60L 2230/40* (2013.01); *B60L 2240/622* (2013.01); *B60L 2240/70* (2013.01); *B60L 2240/72* (2013.01); *B60L 2250/12* (2013.01); *B60L 2250/16* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
CPC ................ B60L 11/1848; B60L 11/1861
USPC .............................................. 320/109
See application file for complete search history.

(56) References Cited

U.S. PATENT DOCUMENTS

| | | | | |
|---|---|---|---|---|
| 8,232,765 | B2* | 7/2012 | Billmaier | H02J 3/02 320/104 |
| 8,502,498 | B2* | 8/2013 | Fecher | B60L 11/1844 180/65.29 |
| 9,108,525 | B2* | 8/2015 | Przybylski | B60L 11/1861 |
| 9,348,381 | B2* | 5/2016 | Khoo et al. | B60L 11/1825 |
| 9,393,879 | B2* | 7/2016 | Tyagi et al. | B60L 11/1844 |
| 2010/0274570 | A1* | 10/2010 | Proefke et al. | B60L 11/1824 705/1.1 |
| 2014/0012448 | A1* | 1/2014 | Tripathi et al. | G05D 1/0276 701/22 |
| 2015/0198459 | A1* | 7/2015 | MacNeille et al. | G01C 21/3697 701/22 |

* cited by examiner

*Primary Examiner* — Sun Lin
(74) *Attorney, Agent, or Firm* — Cesari & Reed LLP; R. Michael Reed (57) ABSTRACT

An apparatus includes a processor configured to receive an input signal corresponding to a selected charging station. The processor is further configured to select an electrical charge allocation from an available power budget of the selected charging station in response to the input signal.

18 Claims, 9 Drawing Sheets

AUTOMOTIVE RECHARGE SCHEDULING SYSTEMS AND METHODS

CROSS-REFERENCE TO RELATED APPLICATION(S)

This application is a non-provisional of and claims priority to U.S. Provisional Application No. 61/984,353 filed on Apr. 25, 2014 and entitled "Automotive Recharge Scheduling Systems and Methods," which is incorporated herein by reference in its entirety.

FIELD

The present disclosure is generally related to electrical recharge stations for automobiles, and more particularly to systems and methods of scheduling an automotive recharge.

BACKGROUND

Electric vehicles include one or more electrical motors configured to operate using electrical power. The electric motor may be powered by rechargeable battery packs, which are carried by the vehicle. To recharge the battery packs, the user must plug the vehicle into an electrical source, such as a recharge station.

SUMMARY

In an embodiment, an apparatus includes a processor configured to receive an input signal corresponding to a selected charging station. The processor is further configured to select an electrical charge allocation from an available power budget of the selected charging station in response to the input signal. In certain embodiments, the processor may be part of a server or other computing system configured to receive the input signal through a communication network.

In another embodiment, a system includes a network interface configured to couple to a network and a processor coupled to the network interface. The system further includes a memory accessible to the processor and configured to store instructions that, when executed, cause the processor to receive a signal from a computing system. The memory further includes instructions that cause the processor to determine available charging stations within a driving range of an electric vehicle and having sufficient power available to recharge the electric vehicle and provide data corresponding to the available charging stations to the computing system. In certain embodiments, the available charging stations may include those that are in close proximity to the electric vehicle in need of charging.

In still another embodiment, a method of scheduling an automotive recharge includes receiving a user input corresponding to a selected charging station of a plurality of available charging stations at a device from a computing device. The method further includes reserving an electrical charge allocation at the selected charging station in response to receiving the user input.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage medium or memory device, including instructions that when executed cause a processor to perform the methods.

Embodiments of systems and methods are described below that allow a user to identify an available recharge station and to reserve the available recharge station (i.e., an amount of electrical charge, a recharge spot or stall, the entire recharge station, or any combination thereof) for the user until arrives at the recharge station and enters his reservation number. In certain embodiments, instead of or in addition to a reservation code, the user may access the reserved charge based on an automated method including wireless or wired communication between an interface of the recharge station and a device, such as a radio frequency identification (RFID) tag, a ZigBee® receiver, an optical scan of a Quick Response (QR) code on a piece of paper, a reward card, a display of a smart phone, and the like. As used herein, the term "recharge station" or "automobile charging station" refers to a location configured to provide an electrical charge for recharging an electric vehicle. Further, as used herein, the term "available recharge station" or "available automobile charging station" refers to a recharge station that has sufficient electrical charge available (stored or dynamically available from an electrical grid) to provide a full recharge of the vehicle.

Figure 1:
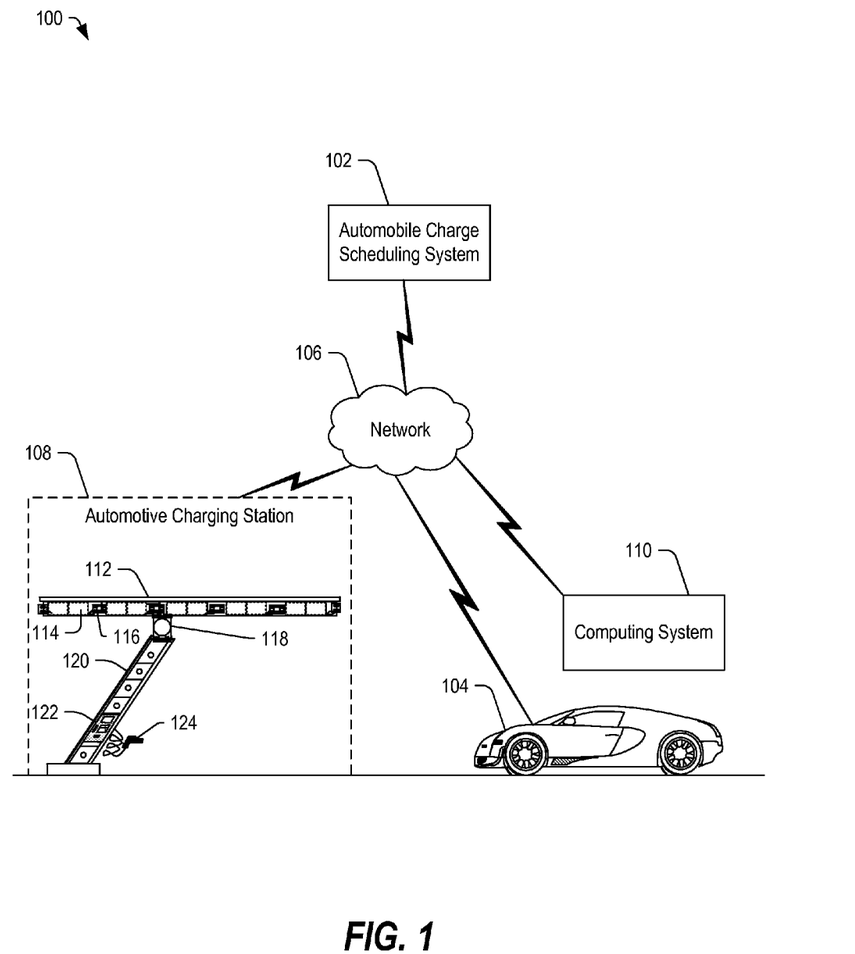
FIG. 1 is a block diagram of a system including an automobile charge scheduling system according to some embodiments.

FIG. 1 is a block diagram of a system 100 including an automobile charge scheduling system (ACSS) 102 according to some embodiments. The ACSS 102 may communicate with a computing system of a vehicle 104, an automotive charging station 108, a computing system 110, or any combination thereof, through a network 106. In some embodiments, the network 106 may be a short-range wireless network. In some embodiments, the network 106 may be a wide area network, such as the Internet, a cell phone network, a public switched telephone network, a satellite network, a digital telephone communications network, or any combination thereof.

In some embodiments, the automotive charging station 108 may be a solar powered recharge station, in which case, the available charge may be generated using photovoltaic cells and the charge may be stored in power storage units of the recharge station. The power budget of the automotive charging station 108 may be sufficient to recharge a pre-determined number of electric vehicles, such as electric car 104, up to a particular amount of charge. For example, in some embodiments, the automotive charging station 108 may store sufficient charge to recharge up to six electric cars. However, once the stored charge is depleted, the automotive charging station 108 may be unavailable until the recharge capacity is restored through conversion of solar energy. In certain embodiments, if the automotive charging station 108 is coupled to the electrical grid or to an electrical generator configured to generate electricity from a fuel, such as natural gas, a bio-diesel, another fuel, or any combination thereof, the automotive charging station may restore its recharge capacity through such electrical generation. In certain embodiments, the automotive charging station 108 may restore its recharge capacity from excess charge provided by other charging stations, solar panels, and the like over a period of time sufficient to produce enough charge to recharge at least one vehicle.

In some embodiments, the automotive charging station 108 may include solar power, electrical grid power, an electrical generator, other power sources, or any combination thereof. The automotive charging station 108 may also include a high voltage, high power (fast) recharge capability as well as lower power (slow) recharge capabilities. In some embodiments, a user may selectively reserve one of a fast or slow recharge slot and may pay a different rate depending on the recharge speed.

In some embodiments, the user may interact with an interface within his/her electric car 104 to select an automotive charging station 108 from a list of automotive charging stations and to reserve an electrical charge allocation, a recharge spot, a recharge stall, or any combination thereof at the automotive charging station 108. In some embodiments, the user may interact with an interface of a computing system 110, such as a smart phone, a tablet computer, a laptop computer, an interface of his/her vehicle, or any combination thereof, to select an automotive charging station 108 from a list of automotive charging stations and to reserve the electrical charge allocation, the recharge spot, the recharge stall, or any combination thereof at the automotive charging station 108.

In some embodiments, an ACSS 102 may receive a request to identify an available recharge station from a computing system of an electric car 104, or from another computing system 110, such as a smart phone, a tablet computer, a stand-alone computing system, or any combination thereof. The ACSS 102 may identify one or more automobile charging stations 108 having sufficient electrical charge to recharge an electric vehicle, and may provide a list of the one or more available automobile charging stations 108 to the computing system. The user may interact with an input interface of the computing system to select an automotive charging station 108 from the list, and the computing system may send a signal to the ACSS 102 indicating the selection. In response to the signal, the ACSS 102 may reserve an electrical charge allocation, a recharge spot, a recharge stall, or any combination thereof at the selected automotive charging station 108 in response to the signal. In some embodiments, the automotive charge scheduling system 102 may make the reservation by sending a signal to the automotive charging station 108.

In some embodiments, the ACSS 102 may store a billing code or identifier associated with the user or the user's vehicle and may charge a user account associated with the billing code or identifier in response to making the reservation. In some embodiments, the ACSS 102 may charge a credit card associated with a user in response to making the reservation. In some embodiments, the ACSS 102 may charge a phone number or apply a charge to a user account in response to making the reservations. In some embodiments, the ACSS 102 does not apply a charge to the user's account until the user actually accesses the reserved automotive charging station 108 to recharge his/her electric car 104 or until the user fails to access the reserved charge for a period of time (such as 24 hours). In the event of a missed reservation, the ACSS 102 may charge a small penalty to the user's account and may cancel the reservation to allow the available charge to be made available to other vehicles and/or for other reservations. In certain embodiments, the charge may be reserved (or held) for a pre-determined period of time.

In some embodiments, the user may interact with a computing system within his/her electric car 104. In some embodiments, the user may interact with a touch screen on a dashboard of the electric car 104 to schedule a recharge. In some embodiments, the user may interact with an interactive voice response system, which may provide an audio alert corresponding to a state of the electrical charge of the electric car and which may provide an option for the user to initiate a recharge reservation operation. One possible example of such an alert is described below with respect to FIG. 2.

Figure 2:
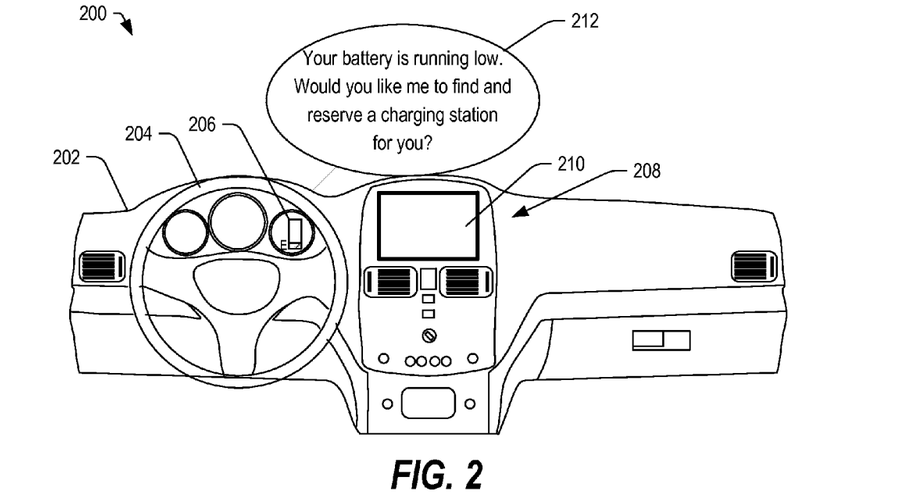
FIG. 2 is a diagram of a vehicle dashboard of an electric car including a computing system configured to schedule a recharge according to some embodiments.

FIG. 2 is a diagram 200 of a vehicle dashboard 202 of an electric car 104 including a computing system, generally indicated at 208, that is configured to schedule a recharge according to some embodiments. The computing system 208 may be a built-in computing system including a wireless transceiver configured to communicate with an ACSS 102 through a network 106 (shown in FIG. 1).

The vehicle dashboard 202 includes air vents, various buttons and controls, a steering wheel 204, and a battery power indicator 206. The vehicle dashboard 202 may further include a display console 210. In some embodiments, the display console 210 may be a touchscreen interface accessible by a user to perform various functions. In some embodiments, the vehicle dashboard 202 may include one or more speakers that may be configured to provide an audible output (such as that generally indicated by the bubble 212).

In some embodiments, the computing system 208 may receive a signal from a power level sensor (not shown) of the electric car 104. In response to the signal, the computing system 208 may update the battery power indicator 206 on the vehicle dashboard 202 and, when the power level indicated by the signal falls below a threshold level, the computing system 208 may provide an audio output 212 to alert the user. In some embodiments, the vehicle dashboard 202 may include a microphone (not shown) to receive an audio input, which may be communicated to the network 106 by a network transceiver associated with the computing system 208, such as to facilitate bi-directional voice communications. In some embodiments, the computing system 208 may provide a speech-to-text feature configured to convert a speech input into text for further processing.

In an example, the computing system 208 may be configured to determine a power level of the batteries of the electric car 104, update the battery power indicator 206, and provide an audio alert through the speaker. In the illustrated example, the audio alert includes the following statement and user prompt: "Your battery is running low. Would you like me to find and reserve a charging station for you?" In some embodiments, the vehicle dashboard 202 includes a microphone, and the user may respond to the prompt with a "Yes" or a "No." In response to a "No", the computing system 208 may schedule a follow up alert to remind the user to recharge. In response to a "Yes," the computing system 208 may communicate with the ACSS 102 to identify one or more charging stations within a driving range of the electric car 104, which stations may be presented on the display console 210, through the speaker, or any combination thereof In some embodiments, the alert may include a beep, a whistle, or some other audio alarm, and the statement and user prompt may be provided on the display console 210 together with one or more user-selectable elements with which the user may interact to control the operation of the computing system 208. In some embodiments, the user may touch a "Yes" button on the display console 210 in response to the user prompt. In response to the user input, the computing system 208 may communicate with the ACSS 102 to identify one or more charging stations within a driving range of the electric car 104. The computing system 208 may receive a list of available charging stations and may present the list to the user on the display console 210. In some embodiments, the list may be displayed on a roadmap on the display console 210. One possible example of such a presentation is described below with respect to FIG. 3.

Figure 3:
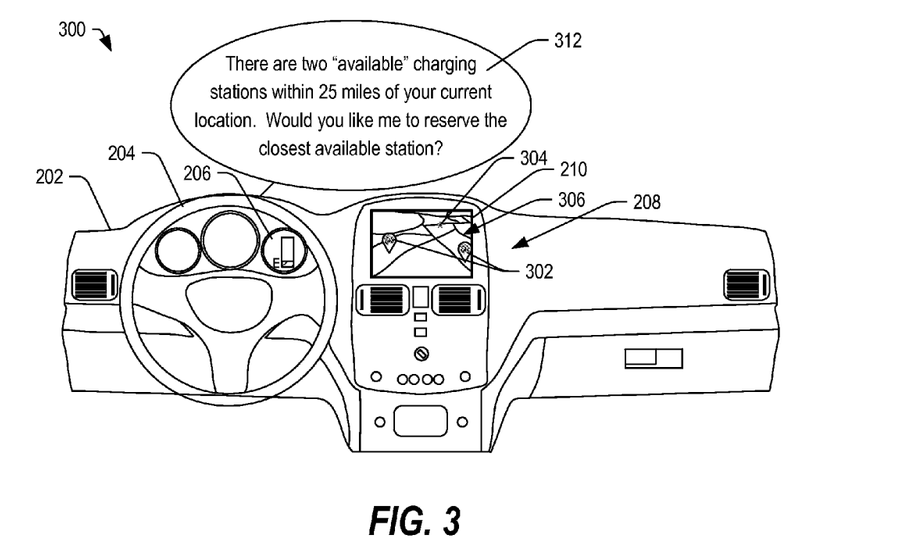
FIG. 3 is a diagram of a vehicle dashboard of an electric car including a computing system configured to schedule a recharge according to some embodiments.

FIG. 3 is a diagram 300 of a vehicle dashboard 202 of an electric car 104 including a computing system 208 configured to schedule a recharge according to some embodiments. In response to receiving list of available charging stations from the ACSS 102, the computing system 208 may present the list on a map 306 within the display console 210. The map 306 may include icons indicating a location of available charging stations 302 and an icon indicating a current position 304 of the electric car 104 relative to the available charging stations 302. Further, the computing system 208 may provide an audio alert through the speaker (not shown). In some embodiments, the audio alert may indicate a number of available charging stations within the driving range of the electric car 104 and a prompt requesting user input. In the illustrated example, the audio alert includes the following statement and prompt: "There are two 'available' charging stations within twenty-five miles of your current location. Would you like me to reserve the closest available station?"

In some embodiments, the user may provide a spoken instruction, which may be received by the computing system 208 via a microphone (not shown), and the computing system 208 may operate on the audio input from the user. For example, if the user says "Yes," the computing system 208 may communicate with the ACSS 102 to reserve the selected charging station. Otherwise, the computing system 208 may prompt the user to select a different one of the charging stations.

In some embodiments, the user may interact with the display console 210, which may be a touchscreen interface, to select one of the recharge stations presented on a map. In some embodiments, the available charging stations may be presented in a selectable list on the display console, and the user may select one of the charging stations from the list by interacting with the display console 210. In response to the selection of one of the recharge stations, the computing system 208 may communicate with the ACSS 102 to reserve the selected charging station.

In some embodiments, the computing system 208 may be built into the electric car 104 to facilitate recharge scheduling by a user. In some embodiments, the user may utilize a portable computing system 110, such as a smart phone, tablet computer, or other computing device to reserve a recharge station.

Figure 4:
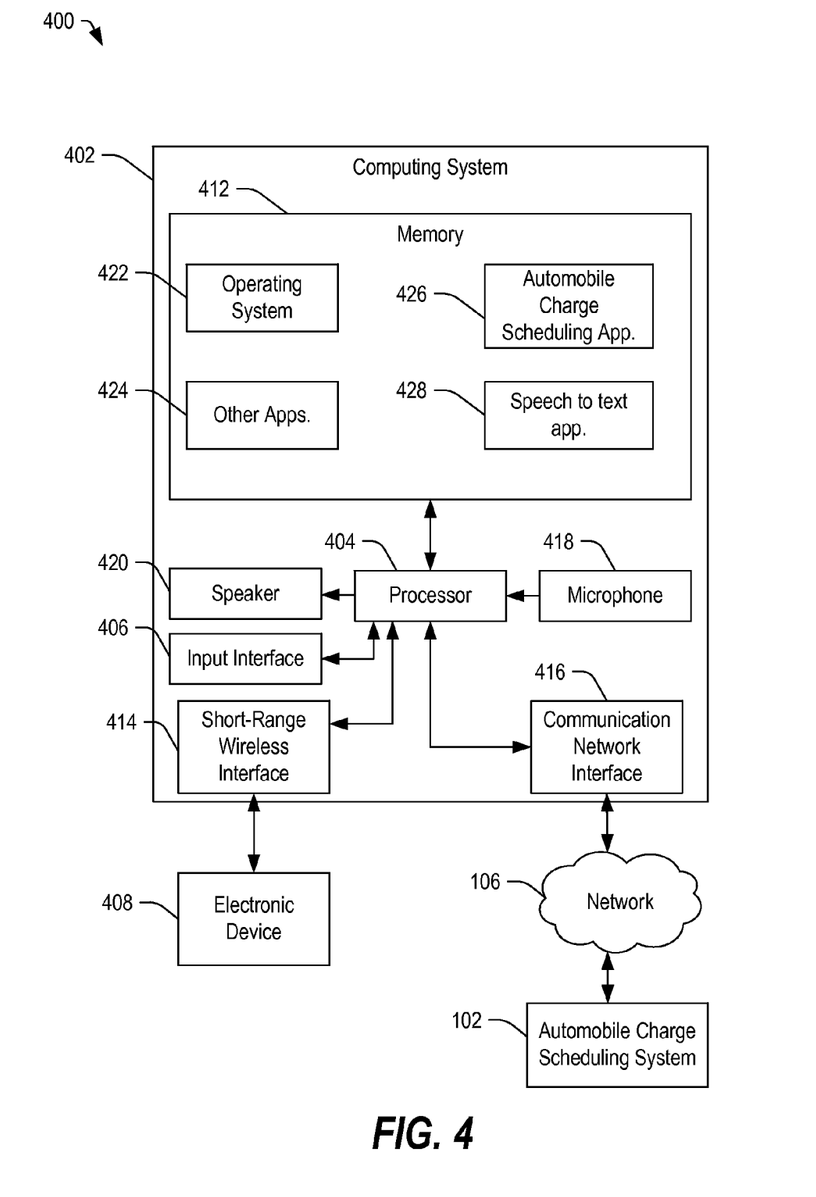
FIG. 4 is a block diagram of a computing system configured to schedule a recharge according to some embodiments.

FIG. 4 is a block diagram 400 of a computing system 402 configured to schedule a recharge according to some embodiments. The computing system 402 may be the computing system 208 within the vehicle dashboard 202 of FIG. 2 or may be the computing system 110 of FIG. 1. The computing system 402 includes a processor 410 and a memory 412 that is accessible to the processor. The memory 412 stores instructions that, when executed, cause the processor 410 to perform a variety of functions. The computing system 402 may include a short-range wireless interface 414 (such as a Bluetooth® transceiver) that may be configured to communicate wirelessly with an electronic device 408. In some embodiments, the computing system 402 may be a smart phone, and the short-range wireless interface 414 may be configured to communicate wirelessly with an ear piece and/or with a corresponding transceiver associated with the computing system 208 of the electric car 104.

The computing system 402 may further include a communication network interface 416 that is coupled to the processor 410 and that is configured to communicate data to and from the network 106 and which may be configured to communicate with the ACSS 102 through the network 106. The computing system 402 may further include an input interface 406 (such as a touchscreen interface, a keypad, or any combination thereof) coupled to the processor 410. The input interface 406 may include a display to provide information to a user and may include a touch-sensitive interface configured to receive user interactions responsive to the displayed information. The input interface 406 may be configured to convert the user interactions into signals and to communicate the signals to the processor 410.

The computing system 402 may also include a microphone 418 configured to capture sounds and to convert the sounds into audio signals, which may be provided as a digital audio input to the processor 410. The computing system 402 may also include one or more speakers 420 coupled to the processor 410. The one or more speakers 420 may convert signals from the processor 410 into sounds, such as the statements and prompts depicted and described with respect to FIGS. 2 and 3.

The memory 412 may store operating system instructions 422 that, when executed, cause the processor 410 to provide a graphical user interface to the input interface 406 and to control overall operation of the computing system 402. The memory 412 may also store a variety of applications 424, such as calendar applications, calculators, email applications, Internet browsers, games, and other applications, which may be executed by the processor 410. The memory 412 may further store an automobile charge scheduling application 426 that, when executed, cause the processor 410 to interact with the ACSS 102 to schedule a recharge for the user. Further, the memory 412 may include a speech-to-text application 428 that, when executed, causes the processor 410 to convert audio input from the microphone 418 into text, which may be processed to determine a user input.

In some embodiments, the computing system 402 may provide a signal to the input interface 406, to the speaker 420, or any combination thereof indicating a state of the battery of the electric car 104 and prompting the user for a user input. The computing system 402 may receive a user input from the input interface 406, from the microphone 418, or any combination thereof, and may interact with the ACSS 102 using the automobile charge scheduling application 426 to schedule a recharge for the user.

Figure 5:
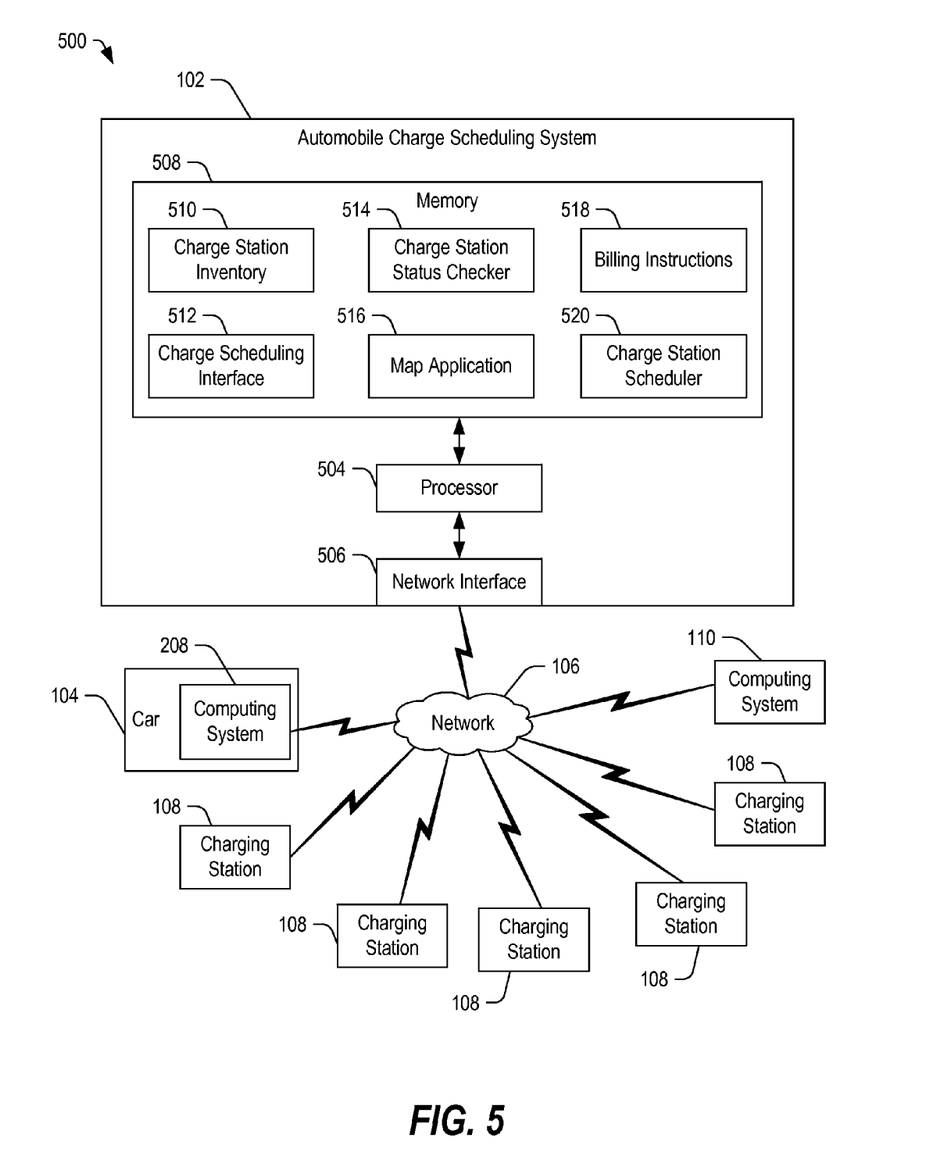
FIG. 5 is a block diagram of a system including an automobile charge scheduling system according to some embodiments.

FIG. 5 is a block diagram of a system 500 including an ACSS 102 according to some embodiments. The ACSS 102 may be configured to communicate with one or more charging stations 108 through the network 106. In some embodiments, at least some of the charging stations 108 may be solar recharge stations, which are not coupled to the electrical grid and/or which do not draw power from the electrical grid to recharge vehicles. Instead, such charging stations 108 derive power from solar energy conversion and store the energy for vehicle recharge, such that these charging stations 108 may provide power to a limited number of vehicles the stored energy may be used up and the charging station 108 may have to recharge itself over a period of time. The ACSS 102 may also be configured to communicate with one or more computing systems, such as the computing system 208 of the electric car 104 and the computing system 110, through the network 106.

The ACSS 102 may include a processor 504 coupled to a network interface 506 and to a memory 508. The memory 508 may store instructions that, when executed, cause the processor 504 to schedule recharge events for a plurality of electric cars 104. The memory 508 includes a charge station inventory 510 including a list of charging stations 108 and their last known charging status. The memory 508 may further include charge station status checker instructions 514 that, when executed, cause the processor 504 to communicate with the one or more charging stations 108 to determine the charge status of each of the charging stations 108 and to process the charge status data to determine which of the charging stations 108 have sufficient charging capabilities to recharge the electric car 104.

The memory 412 may also include a charge scheduling interface 512 that, when executed, causes the processor 504 to provide an interface to the computing system (208 or 110) for presentation to the user. The memory 412 may further include a map application 516 that, when executed, causes the processor 504 to generate a roadmap including an indicator representing a current location of the computing system on the map (based on global positioning satellite (GPS) data provided by the computing system) and including one or more indicators representing available charging stations 108. The memory 412 further includes billing instructions 518 that, when executed, cause the processor 504 to charge an account associated with the user to reserve a charging station. In some embodiments, the charge may be a nominal charge to reserve the station, which charge may be applied toward the charge associated with the providing of the electricity by the charging station when the user arrives to recharge the electric car 104 and enters his/her code.

Figure 6:
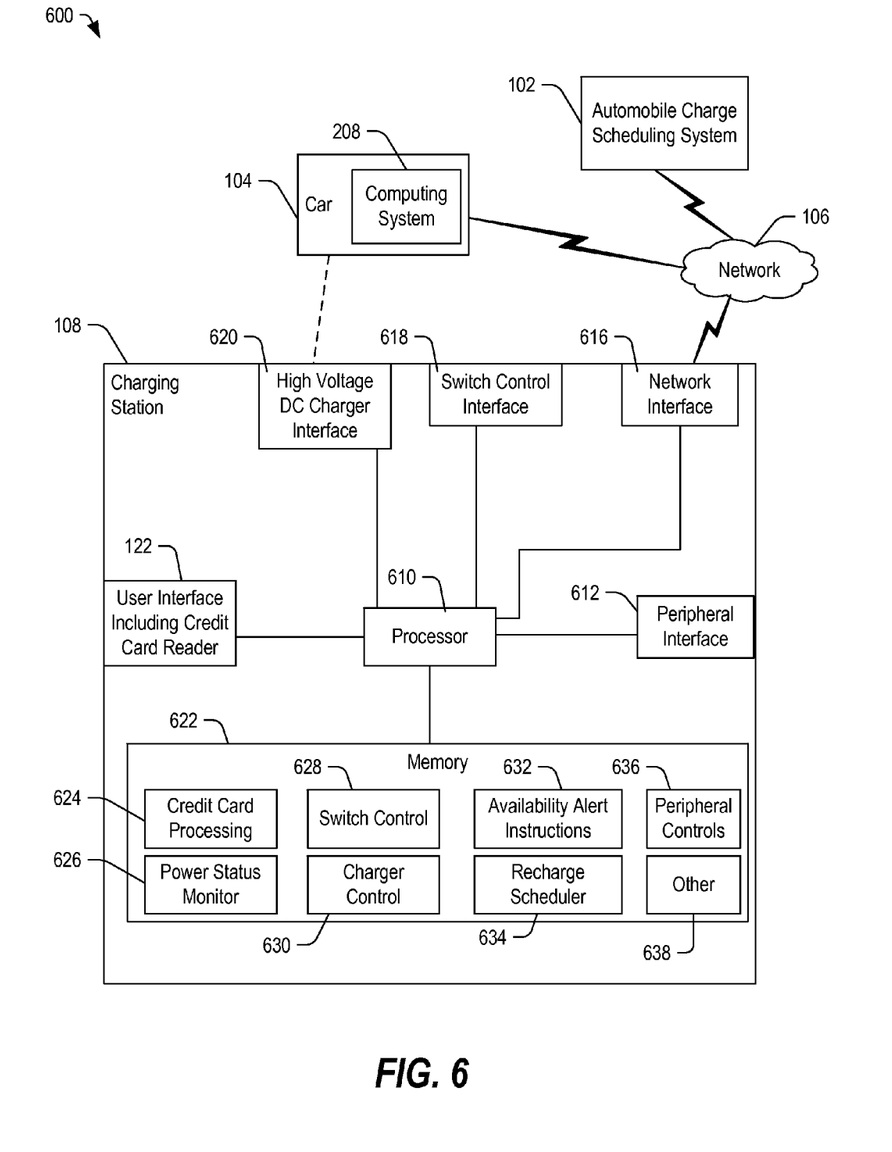
FIG. 6 is a block diagram of a system including a charging station responsive to an automobile charge scheduling system according to some embodiments.

FIG. 6 is a block diagram of a system 600 including a charging station 108 responsive to an ACSS 102 according to some embodiments. The charging station 108 may communicate with the ACSS 102 through the network 106, and the computing system 208 of the electric car 104 may also communicate with the ACSS 102 through the network 106.

The charging station 108 includes a processor 610 coupled to a memory 610, a user interface including a credit card reader 614, and a peripheral interface 612. In some embodiments, the peripheral interface 612 may be coupled to one or more peripheral devices, such as lights, a fan, vending machines, and the like, to provide power and/or communication capabilities. Further, the processor 610 may be coupled to a switch control interface 618 and to a high voltage DC charger interface 620, which may be coupled to the electric car 104 to provide a recharge.

In some embodiment, the memory 622 is configured to store instructions that, when executed, cause the processor 610 to schedule, reserve, and process recharge operations. In the illustrated example, the memory 622 may include credit card processing instructions 624 that, when executed, causes the processor 622 to receive credit or debit information from user interface 614 and to process a charge via a charge processing system accessible through network 106. In some embodiments, the user interface 614 may include a credit card reader, a radio frequency identification (RFID) reader, a near field card (NFC) reader, or other identification reader. The user interface 614 may also include a key pad, a touch screen, another input interface, or any combination thereof.

The memory 622 may include a power status monitor 626 that, when executed, causes the processor 610 to determine the charge status of the power storage batteries and/or the availability of power from the power grid. The memory 622 may also include switch control instructions 6288 that, when executed, cause the processor 610 to control switches, such as coupling switches to selectively deliver power to a load. The memory 622 may also include charger control instructions 630 that, when executed, cause the processor 610 to selectively enable the charging system to deliver power to the load, such as an electric car 104.

The memory 622 may further include peripheral control instructions 636 that, when executed, cause the processor 610 to control one or more peripheral devices, such as lights, a ceiling fan, and other peripheral elements (not shown), which may be mounted to the underside of a canopy of the charging station 108. The memory 622 may also include other instructions 638 that, when executed, cause the processor 610 to perform other functions, including upgrading other stored software modules as needed, monitoring external devices (such as soda machines or other machines to determine when they should be refilled, and so on).

The memory 622 may further include availability alert instructions 632 that, when executed, cause the processor 610 to check the power status of the power storage units to determine whether sufficient charge is available for charging a load (and optionally whether the charge is available for a fast, high-voltage charging operation or for a longer duration charge operation and to communicate the power status (charge status) to the network 106. The availability alert instructions 632 may include transceiver control instructions, formatting and communications protocol instructions, and other instructions including scheduling of communications. Further, the availability alert instructions 632 may cause the processor 610 to provide information to a remote server (such as the automobile charge scheduling system 102) via network 106 indicating the charge status, i.e., the availability of the charging station 108 for charging an electric car 104.

The electric car 104 may be provided with a computing system 208, such as an on-board navigation system, capable of interacting with the automobile charge scheduling system 102 to determine available charging stations, to reserve the charging station, and to receive directions to the selected (reserved) charging station for recharge. In an embodiment, a driver may pre-pay for a charging station and reserve a spot, which reservation and payment may be communicated between the computing system 208 and the automobile charge scheduling system 102 through the network 106.

The memory 622 may include recharge scheduler instructions 634 that, when executed, cause the processor 610 to reserve the recharge slot for the driver. In some embodiments, reserving a recharge slot may include making a recharge stall at the charging station 108 unavailable, either via a physical barrier or via some indicator, such as a stop sign or an electronic sign indicating "not available". In some embodiments, reserving a recharge slot may include reserving an electric charge allocation from a total power budget of the charging station 108 for recharge of the electric car 104 associated with the user. When the driver arrives, he or she may enter a code or otherwise interact with the user interface 614 to log in to initiate the recharge operation, which causes the processor 610 to execute the switch control instructions 628 and/or the charger control instructions 630 to provide power to the load, such as the battery pack of the electric car 104.

In some embodiments, the charging station 108 may receive a query from the automobile charge scheduling system 102 regarding the recharge availability of the charging station 108 for a particular electrical amount (i.e., a particular amount of charge). The charging station 108 may determine its power budget and provide an indication of its availability to the automobile charge scheduling system 102 in response to the query. The charging station 108 may then receive a reservation signal and optionally billing information from the automobile charge scheduling system 102, and may schedule the recharge event by pre-allocating the requested amount of charge to a particular requester. In some embodiments, the reservation signal may include an access code or other identifier that may be verified against data provided by a user to determine whether to release the charge allocation for recharging the electric car 104.

It should be understood that the charging station 108 may be configurable to operate with any number of power sources, including a grid power source, a power generator (such as photovoltaic generator, a wind power generator, a fuel-based generator), other power sources, or any combination thereof. In an embodiment, for the driver's comfort, a car port structure or canopy may be provided under which the driver may park his/her vehicle during the recharge operation. In an example, the canopy may be formed from a plurality of integrated energy generation modules, which may be coupled to a high-voltage, fast power charging system (such as the high voltage DC charger interface 620) and to the processor 610 to provide a recharge station for electric cars.

Figure 7:
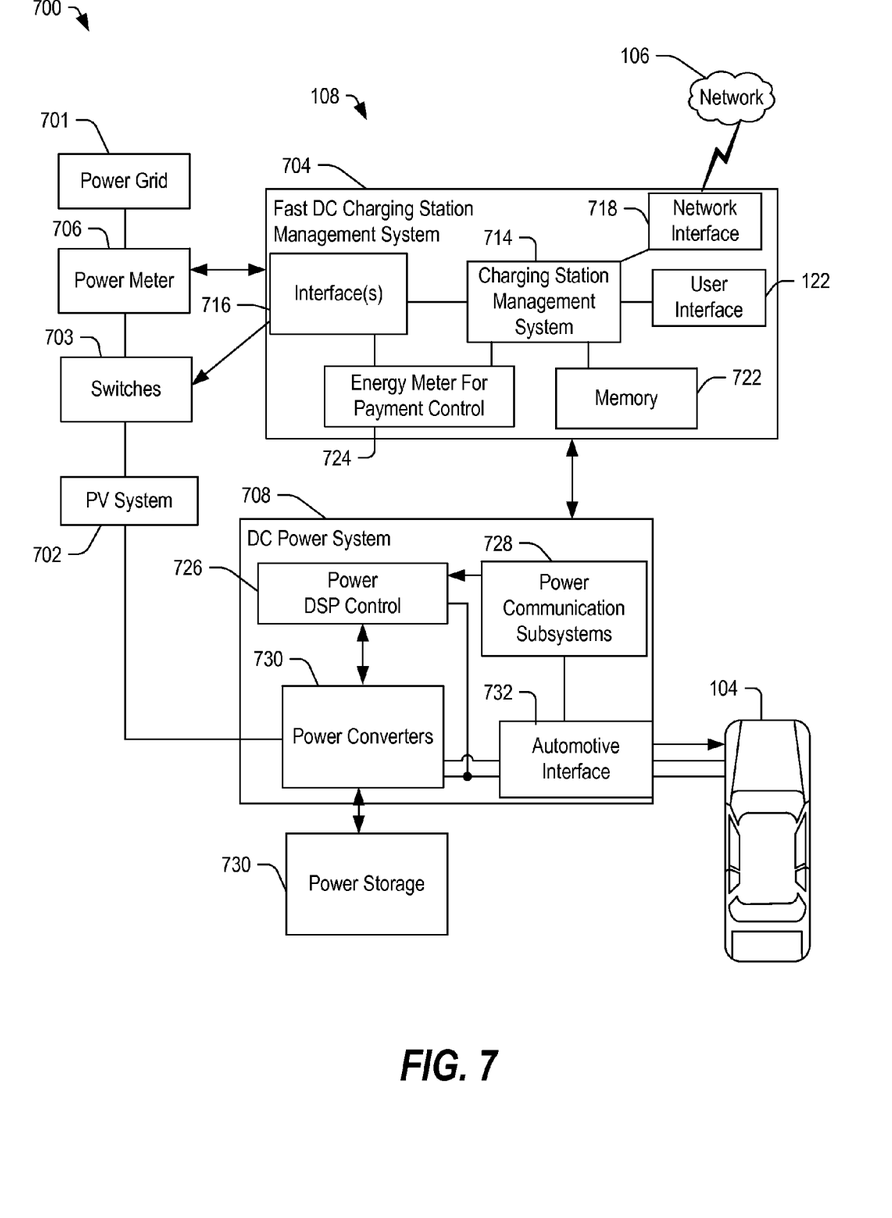
FIG. 7 is a block diagram of a system including an automobile recharge station responsive to an automobile charge scheduling system according to some embodiments.

FIG. 7 is a block diagram of a system 700 including an automobile recharge station (charging station 108) responsive to an automobile charge scheduling system 102 according to some embodiments. The system 700 includes the charging station, generally indicated at 108, which may be coupled to the power grid 701 through a power meter 706.

In some embodiments, the charging station 108 may include a photovoltaic (PV) system 702, a fast DC charging station management system 704 and a DC power system 708. The PV system 702 may include one or more photovoltaic generation systems (such as solar panels), which may be coupled to the power meter 706 through one or more switches 703 and which may be coupled to the DC power system 708. The fast DC charging station management system 704 may include one or more interfaces 716, which may be coupled to the power meter 706 and to the switches 703 to selectively couple the PV system 702 to the power meter 706. The fast DC charging station management system 704 may also include a charging station management system 714 coupled to the one or more interfaces 716 and to a network interface 718, which may be communicatively coupled to the network 106. The fast DC charging station management system 704 may further include a user interface 720 through which a user may enter his/her access code and/or payment information and which may be coupled to the charging station management system 714. The fast DC charging station management system 704 may also include a memory 722 coupled to the charging station management system 714. The memory 722 may store customer data and may store instructions that may be executed by the charging station management system 714 (which may include one or more processors) to manage electricity allocations, reservations, and billing. The fast DC charging station management system 704 may also include an energy meter for payment control 724 coupled to the one or more interfaces and to the charging station management system 714.

The DC power system 708 may include one or more power converters 730 configured to filter and distribute power received from the PV system 702 and to provide the power to power storage 730, which may include a plurality of battery subsystems or other power storage systems. The DC power system 708 may also include a power digital signal processor (DSP) control 726, which may be coupled to the power converters 730 and which may be coupled to power communication subsystems 728. The power communication subsystems 728 may receive data and instructions from the fast DC charging station management system 704 and may allocate an amount of electricity for a particular recharge event (a reserved allocation for a pre-paid customer, for example). The power communication subsystems 728 may be coupled to the power DSP control 726 and to an automotive interface 732, which may be configured to provide electrical power to a power storage system of the electric car 104.

In some embodiments, the user may interact with the fast DC charging station management system 704 to reserve an electrical allocation for recharging the electric car 104 and to enable distribution of the electrical allocation through the automotive interface 732. The user may couple a recharge port of the electric car 104 to the automotive interface 732 and enter a code to initiate the recharge operation.

Figure 8:
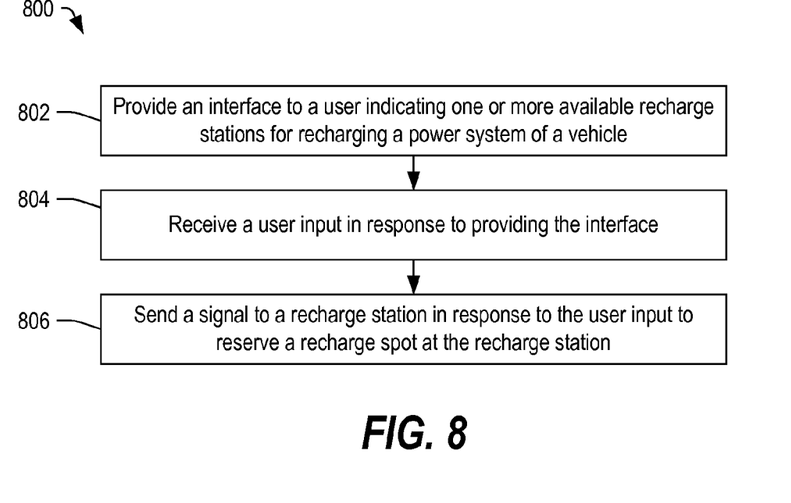
FIG. 8 is a flow diagram of a method of reserving a recharge spot at a recharge station using an automobile charge scheduling system according to some embodiments.

FIG. 8 is a flow diagram of a method 800 of reserving a recharge spot at a recharge station using an automobile charge scheduling system according to some embodiments. At 802, an interface may be provided to a user indicating one or more available charging stations for recharging a power system of a vehicle. In some embodiments, the interface may be provided on a touchscreen of a portable computing device, such as a smart phone, a tablet computer, or other portable computing device. In some embodiments, the interface may be provided on an interface of a computing system within a vehicle, such as an on-board computing system. In some embodiments, the user interface may be a graphical user interface (GUI) that includes one or more user-selectable elements accessible by a user to interact with selectable options provided by the GUI.

Figure 9:
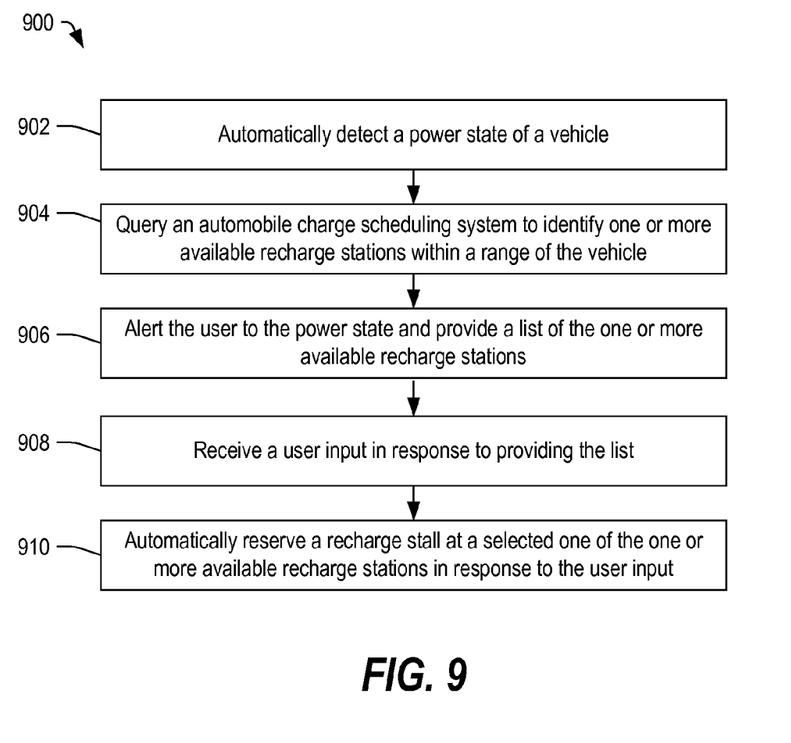
FIG. 9 is a flow diagram of a method of automatically reserving a recharge spot at a recharge station through an interface of a vehicle according to some embodiments.

Advancing to 804, a user input may be received in response to the interface. The user input may include a signal indicating selection of one or more of the user selectable options by the user. In some embodiments, the user may make selections by clicking one or more buttons, links or elements within the GUI. Continuing to 806, a signal may be sent to a recharge station in response to the user input to reserve a recharge spot at the recharge station. In some embodiments, the signal may be sent to an automotive charge scheduling system 102, which may in turn send a signal to the selected charging station to reserve the recharge spot. In some examples, the recharge spot may include an electrical charge allocation, a physical stall of a recharge station, or any combination thereof FIG. 9 is a flow diagram of a method 900 of automatically reserving a recharge spot at a recharge station through an interface of a vehicle according to some embodiments. At 902, the power state of a vehicle is automatically detected. In some embodiments, a computing system of the electric car 104 monitors its power supply, and the computing system automatically detects the power state of the vehicle based on the power supply level. Advancing to 904, the computing system of the electric car 104 may query an automobile charge scheduling system to identify one or more available recharge stations within a range of the vehicle. In some embodiments, the query may include data related to the amount of charge to recharge the electric car 104.

Continuing to 906, the computing system may alert the user to the power state of the electric car 104 and may provide a list of the one or more available recharge stations (based on data received from the automobile charge scheduling system 102). In some embodiments, the alert may be an audio alert presented through a speaker of the electric car 104. In some embodiments, the alert may be a text alert presented on a computing interface or display within the electric car 104. In some embodiments, the list of the one or more available recharge stations may be presented as an audio list through the speaker. In some embodiments, the list may be provided as a text list on a display.

Moving to 908, the computing system receives a user input in response to providing the list. In some embodiments, the user input may be an electrical signal from a touchscreen interface corresponding to one of the items in the list. In some embodiments, the user input may be an audio input corresponding to one of the items in the list.

Advancing to 910, the computing system automatically reserves a recharge stall at a selected one of the one or more available recharge stations in response to the user input. In some embodiments, the computing system may send a signal to the automobile charge scheduling system 102 to initiate a transaction to reserve the selected recharge station. In some embodiments, the computing system may also initiate a payment transaction to pay for the reservation. In some embodiments, the computing system may receive a confirmation from the automobile charge scheduling system 102 including a code or other indicator that the user may utilize to access the reserved charge allocation at the charging station.

Figure 10:
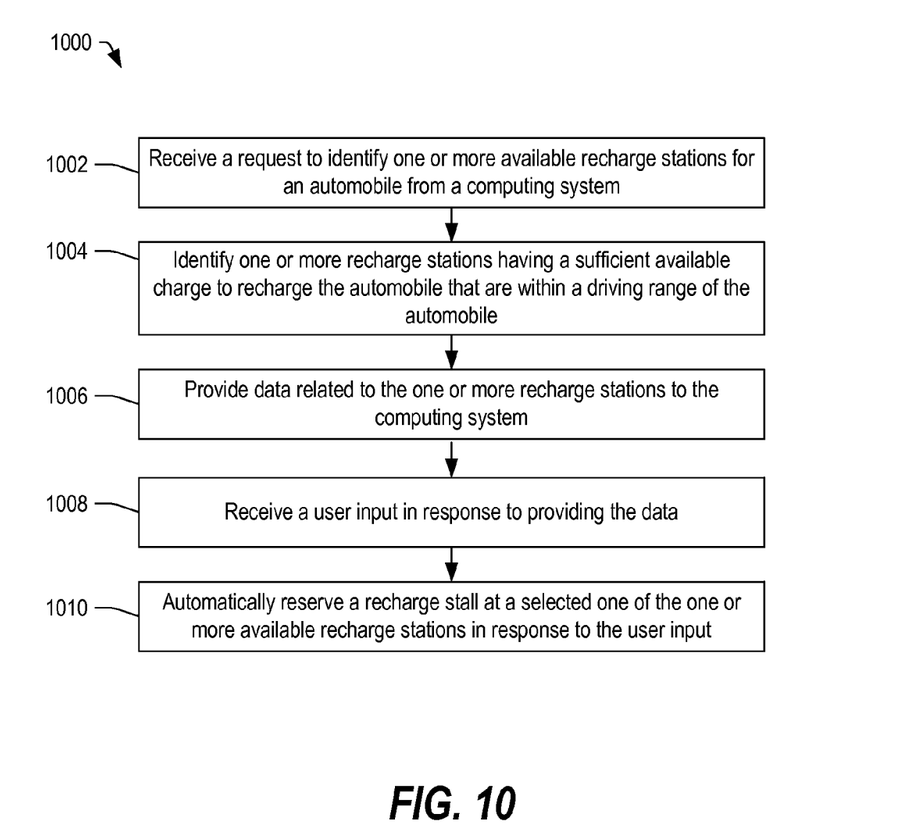
FIG. 10 is a flow diagram of a method of automatically reserving a recharge spot at a recharge station using an automobile charge scheduling system according to some embodiments.

FIG. 10 is a flow diagram of a method 1000 of automatically reserving a recharge spot at a recharge station using an automobile charge scheduling system according to some embodiments. At 1002, a request is received at an automobile charge scheduling system to identify one or more available recharge stations for an automobile from a computing system. In some embodiments, the computing system is built into the electric car 104. In some embodiments, the computing system is a portable computing system that is separate from the electric car 104.

Moving to 1004, one or more recharge stations are identified that have sufficient available charge to recharge the automobile and that are within a driving range of the automobile. In some embodiments, the automobile charge scheduling system 102 may search its data files and/or communicate with a plurality of charging stations 108 to identify the one or more recharge stations.

Continuing to 1006, data related to the one or more recharge stations are provided to the computing system. In some embodiments, the automobile charge scheduling system 102 may send a GUI including the data to the computing system. In some embodiments, the automobile charge scheduling system 102 may send data to the computing system, which may generate the GUI.

Proceeding to 1008, a user input is received in response to providing the data. In some embodiments, a signal is received from the computing system that corresponds to at least one aspect of the provided data. In some embodiments, the signal corresponds to a user-selectable element within the GUI. In some embodiments, the signal may be an audio signal, which may be converted to text and which may be processed to determine the user input. In some embodiments, the signal may include data corresponding to the user selection.

Moving to 1010, a recharge stall is automatically reserved at a selected one of the one or more available recharge stations in response to the user input. In some embodiments, the recharge stall may be an electrical charge allocation from an overall power budget of a charging station. In some embodiments, the recharge stall may include a physical location and a charge allocation.

Figure 11:
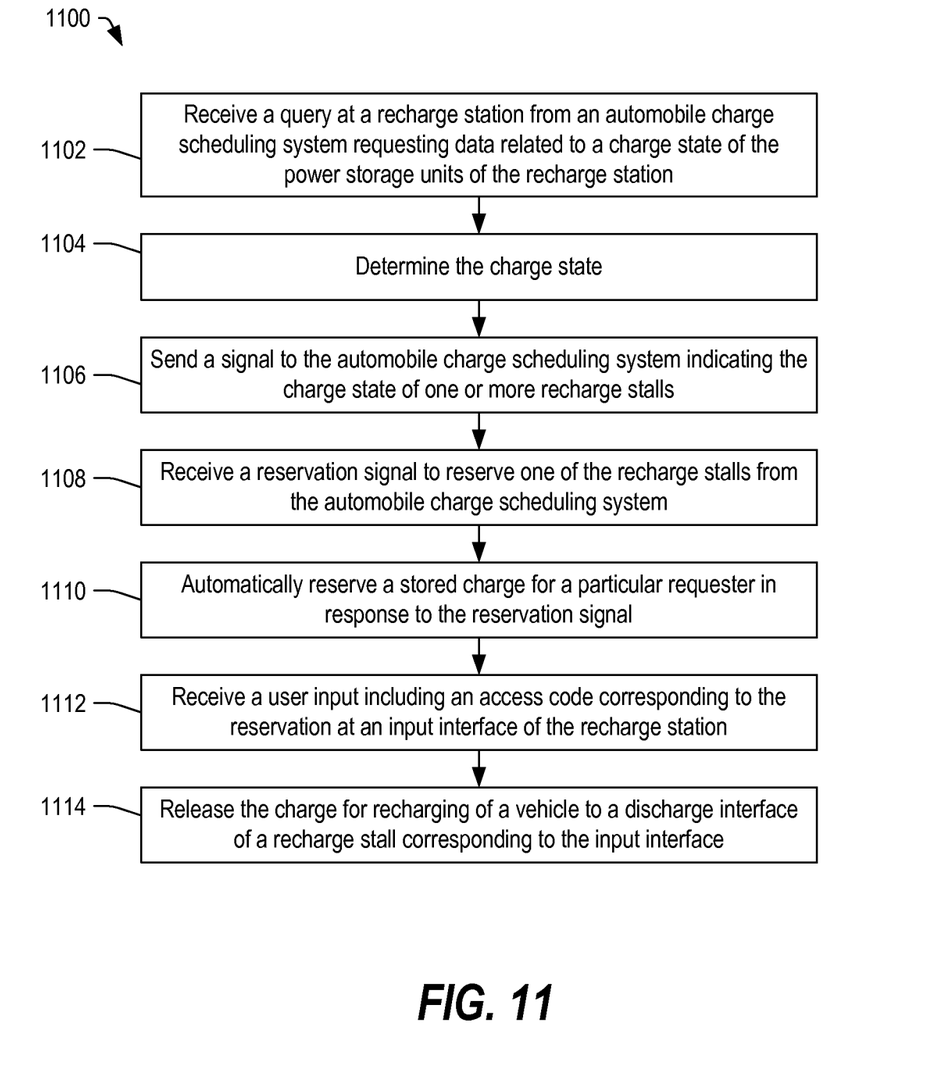
FIG. 11 is flow diagram of a method of reserving and accessing a recharge spot at a recharge station according to some embodiments.

FIG. 11 is flow diagram of a method 1100 of reserving and accessing a recharge spot at a recharge station according to some embodiments. At 1102, a query is received at a recharge station from an automobile charge scheduling system requesting data related to a charge state of the power storage units of the recharge station. Advancing to 1104, the recharge station determines the charge state. Continuing to 1106, the recharge station sends a signal to the automobile charge scheduling system 102 indicating the charge state of one or more recharge stalls. In some embodiments, the recharge station may provide an indication of its overall power budget.

Proceeding to 1108, a reservation signal is received from the automobile charge scheduling system to reserve one of the recharge stalls. In some embodiments, the reservation signal may reserve an amount of electrical charge (i.e., an electrical charge allocation from the overall power budget), so that the reserved amount of electrical charge is not available for other customers. In some embodiments, the reservation signal may also include an access code. Moving to 1110, the recharge station automatically reserves a stored charge for a particular request in response to the reservation signal.

Continuing to 1112, a user input may be received that includes an access code corresponding to the reservation at an input interface of the recharge station. The user input may be received through an input interface at the recharge station, such as through a credit card reader interface. Advancing to 1114, the charge for recharging of the vehicle may be released to a discharge interface (automobile charging interface) of the recharge stall corresponding to the input interface, when the access code received at the user interface matches the access code received from the automobile charge scheduling system 102.

In conjunction with the systems and methods described above with respect to FIGS. 1-11, a user may interact with a computing system, such as a built-in computer within an electric car or a portable computing system, such as a smart phone, tablet, or other computing device, to schedule a recharge event at a charging station for charging the power system of an electric car. In some embodiments, the charging station may be a solar powered charging station, and the reservation may operate to reserve an electrical charge allocation from an overall available power budget of the charging station.

In accordance with various embodiments, the methods described herein may be implemented as one or more software programs running on a computer processor or controller and stored in a non-volatile data storage device (such as a flash memory, a hard disc, a compact disc, another non-volatile data storage medium, or any combination thereof). In accordance with another embodiment, the methods described herein may be implemented as one or more software programs running on a computing device, such as a personal computer, a smart phone, a tablet computer, or another computing device, such as a processor and memory of a built-in computing system within an electric car. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device including instructions that when executed cause a processor to perform the methods. As used herein, the phrases "computer readable storage medium" and "data storage device" and the term "memory" refer to a physical device and associated non-volatile storage medium to which data may be stored.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

The processes, machines, and manufactures (and improvements thereof) described herein are particularly useful improvements for electrical vehicles. Further, the embodiments and examples herein provide improvements in the technology of computing systems configured to identify recharge stations with sufficient stored charge to recharge a vehicle, to accept advanced payment for the recharge, and to reserve the charge for the vehicle for a period of time in response to receiving the payment. In certain embodiments, the system may communicate with a charge station to reserve the charge until a particular code is supplied by the user wanting the recharge. In addition, embodiments and examples herein provide improvements to the functioning of a computer by providing a scheduling system for remotely reserving a recharge stall of an electric vehicle recharge station, thereby creating a specific purpose computer by adding such technology. Thus, the improvements herein provide for technical advantages, such as providing a system in which a user may locate an available vehicle recharge station and may reserve a charge. For example, the systems and processes described herein can be particularly useful to any systems in which a user may want to reserve a charge to ensure that the charge is available when the user arrives at the recharge station. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined (or added) without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a processor configured to:
receive available charge information from each charging station of a plurality of charging stations, at least one of the plurality of charging stations comprising a solar charging station;
provide the information to a computing device associated with at least one of a user and a user's vehicle;
receive an input signal corresponding to a selected charging station of the plurality of charging stations from the computing device; and
select an electrical charge allocation from an available power budget of the selected charging station in response to the input signal.

2. The apparatus of claim 1, wherein the electrical charge allocation is reserved such that the selected charging station releases the electrical charge allocation in response to a an access code.

3. The apparatus of claim 1, wherein the selected charging station releases the electrical charge allocation in response to one of receiving an access code and exceeding a period of time without receiving the access code.

4. The apparatus of claim 1, wherein the processor is further configured to provide an access code corresponding to selection of the electrical charge allocation.

5. The apparatus of claim 1, wherein the processor comprises a built-in computing system of an electric car.

6. The apparatus of claim 1, wherein the processor comprises at least one of a smart phone, a tablet computer, and a laptop computer.

7. A system comprising:
a network interface configured to couple to a network;
a processor coupled to the network interface; and
a memory accessible to the processor and configured to store instructions that, when executed, cause the processor to:
receive a signal from a computing system associated with at least one of a user and an electric vehicle associated with the user;
determine available charging stations from a plurality of charging stations within a driving range of the electric vehicle and having sufficient power available to recharge the electric vehicle, at least one of the plurality of charging stations including a solar charging station;
provide data corresponding to the available charging stations to the computing system;
receive a user input corresponding to a selected charging station in response to providing the data; and
automatically reserve an electrical charge allocation from an available power budget of the selected charging station in response to receiving the user input.

8. The system of claim 7, wherein the data includes a graphical user interface including a plurality of user-selectable elements corresponding to the available charging stations.

9. The system of claim 7, wherein the electrical charge allocation is automatically reserved by sending a signal to the selected charging station.

10. The system of claim 7, wherein the memory further comprises instructions that, when executed, causes the processor to apply a financial charge to an account of a user in response to receiving the user input.

11. The system of claim 7, wherein the user input comprises an audio signal.

12. The system of claim 11, wherein the memory further comprises instructions that, when executed, causes the processor to:
convert the audio signal into a text input; and
reserve the electrical charge allocation based on the text input.

13. A method of scheduling an automotive recharge, the method comprising:
receiving available charge information from each charging station of a plurality of charging stations at the device;
determining the plurality of available charging stations from the plurality of charging stations having sufficient available power to charge an electrical car associated with the computing device in response to receiving the available charge information; and
providing data corresponding to the plurality of available charging stations to the computing device;
receiving a user input corresponding to a selected charging station of the plurality of available charging stations at a device from a computing device; and
reserving an electrical charge allocation at the selected charging station in response to receiving the user input.

14. The method of claim 13, wherein, before receiving the user input, the method comprises:
receiving a query from the computing device requesting available charging stations within a distance from a location associated with the computing device.

15. The method of claim 14, further comprising:
sending an available power query to charging stations of the plurality of charging stations located at distances that are less than or equal to the distance from the location; and
receiving charge information from the charging stations to which the available power query was sent.

16. The method of claim 15, wherein the determining the plurality of available charging stations comprises:
comparing the available charge information from each of the charging stations to which the available power query was sent with a power threshold; and
when the available charge information exceeds the power threshold, adding each associated charging station to a list to produce the plurality of available charging stations.

17. The method of claim 13, wherein the reserving the selected charging station comprises:
sending a signal to the selected charging station to select the electrical charge allocation from an available power budget of the selected charging station.

18. The method of claim 17, wherein the signal includes an access code.

* * * * *